US011492288B2

(12) United States Patent
Ashworth

(10) Patent No.: US 11,492,288 B2
(45) Date of Patent: Nov. 8, 2022

(54) GLASS COATING COMPOSITION

(71) Applicant: Flexitallic Investments, Inc., Houston, TX (US)

(72) Inventor: John Ashworth, Bacup (GB)

(73) Assignee: Flexitallic Investments, Inc., Houston, TX (US)

( * ) Notice: Subject to any disclaimer, the term of this patent is extended or adjusted under 35 U.S.C. 154(b) by 916 days.

(21) Appl. No.: 15/328,448

(22) PCT Filed: Jul. 8, 2015

(86) PCT No.: PCT/GB2015/051983
§ 371 (c)(1),
(2) Date: Jan. 23, 2017

(87) PCT Pub. No.: WO2016/012750
PCT Pub. Date: Jan. 28, 2016

(65) Prior Publication Data
US 2017/0217829 A1     Aug. 3, 2017

(30) Foreign Application Priority Data

Jul. 23, 2014   (GB) ..................................... 1413073
Sep. 11, 2014   (GB) ..................................... 1416085

(51) Int. Cl.
| | |
|---|---|
| C03C 8/14 | (2006.01) |
| H01M 8/0282 | (2016.01) |
| H01M 8/0286 | (2016.01) |
| C09D 1/00 | (2006.01) |
| C03C 8/16 | (2006.01) |
| C09D 7/00 | (2018.01) |
| C03C 8/24 | (2006.01) |
| C09D 7/61 | (2018.01) |
| C09D 7/40 | (2018.01) |
| C09K 3/10 | (2006.01) |
| H01M 8/0284 | (2016.01) |
| H01M 8/12 | (2016.01) |

(52) U.S. Cl.
CPC ................. *C03C 8/14* (2013.01); *C03C 8/16* (2013.01); *C03C 8/24* (2013.01); *C09D 1/00* (2013.01); *C09D 7/00* (2013.01); *C09D 7/40* (2018.01); *C09D 7/61* (2018.01); *C09K 3/10* (2013.01); *H01M 8/0282* (2013.01); *H01M 8/0284* (2013.01); *H01M 8/0286* (2013.01); *H01M 8/12* (2013.01); *C09K 2003/1087* (2013.01); *H01M 2008/1293* (2013.01)

(58) Field of Classification Search
CPC ....................... C03C 8/24–245; H01M 8/0282
See application file for complete search history.

(56) References Cited

U.S. PATENT DOCUMENTS

| | | | |
|---|---|---|---|
| 6,183,871 B1 * | 2/2001 | Lee | C03C 8/14 313/364 |
| 6,656,625 B1 | 12/2003 | Thompson et al. | |
| 7,399,720 B1 * | 7/2008 | Brow | C03C 8/24 501/17 |
| 2002/0090505 A1 | 7/2002 | Stoffers et al. | |
| 2003/0203267 A1 * | 10/2003 | Chou | C04B 37/04 29/434 |
| 2006/0063659 A1 * | 3/2006 | Xue | C03C 8/24 501/15 |
| 2009/0197135 A1 | 8/2009 | Querel et al. | |
| 2010/0180798 A1 | 7/2010 | Saiki | |
| 2012/0318022 A1 | 12/2012 | Nonnet et al. | |
| 2013/0108946 A1 | 5/2013 | Connelly et al. | |
| 2013/0337242 A1 | 12/2013 | Shiao | |
| 2014/0221190 A1 * | 8/2014 | Takayama | C03C 3/064 501/21 |
| 2015/0030963 A1 * | 1/2015 | Surdoval | C03C 14/002 429/509 |
| 2015/0372324 A1 * | 12/2015 | Rautanen | H01M 8/0282 429/509 |

FOREIGN PATENT DOCUMENTS

| | | |
|---|---|---|
| CN | 102386345 B | 3/2012 |
| CN | 103102767 A | 5/2013 |
| EP | 0889010 A1 | 1/1999 |
| EP | 1566368 A2 | 2/2005 |
| EP | 2070507 A1 | 6/2009 |
| EP | 2216306 A2 | 8/2010 |
| WO | 96/22255 A1 | 7/1996 |
| WO | 2006121032 A1 | 11/2006 |
| WO | 2014111735 A1 | 7/2014 |

OTHER PUBLICATIONS

OTHER PUBLICATIONS

International Search Report and Written Opinion in related International Application No. PCT/GB2015/051983 dated Sep. 25, 2015, 13 pages.
Rautanen, M, et al., "Glass Coated Compressible Solid Oxide Fuel Cell Seals", Journal of Power Sources, Aug. 31, 2013, pp. 243-248, vol. 247.
Paul Lessing et al., "A Review of Sealing Technologies Applicable to Solid Oxide Electrolysis Cells", Journal of Materials Science, vol. 42, Issue 10, May 2007, abstract of article, 1 page.

* cited by examiner

*Primary Examiner* — Robert S Carrico
(74) *Attorney, Agent, or Firm* — Kilpatrick Townsend & Stockton LLP

(57) ABSTRACT

A glass coating composition for a fuel cell gasket is described. The coating comprises: a glass component effective to form an alkaline solution in the presence of an equivalent amount of water by weight, a binder component, a liquid carrier which is greater than 50% by volume: water, and a retarder effective to inhibit hardening of the composition. The glass coating composition is particularly useful in fuel cell gaskets and provides improved resistance to solidification in an aqueous dispersion.

20 Claims, No Drawings

GLASS COATING COMPOSITION

CROSS-REFERENCE TO RELATED APPLICATION

This application is the U.S. national phase of International Application No. PCT/GB2015/051983 filed on Jul. 8, 2015, and published on Jan. 28, 2016 as International Publication No. WO 2016/012750 A1, which application claims priority to Great Britain Application No. 1413073.6, filed on Jul. 23, 2014 and Great Britain Application No. 1416085.7, filed on Sep. 11, 2014, the contents of all which are incorporated herein by reference in their entireties.

The present invention relates to a glass coating composition for a fuel cell gasket, more specifically, the invention relates to glass coatings for fuel cell gasket resilient core materials for use in solid oxide fuel/electrolyzer cells (SOFC and SOEC).

SOFC or SOEC stacks require effective high temperature gaskets to operate efficiently. Such seals must be able to substantially prevent fuel, for example hydrogen, leakage; fuel and oxidant mixing; and oxidant leakage. It is understood that seals should also have similar coefficients of thermal expansion to the surrounding components to avoid stresses. The seals also need to be chemically compatible with the stack components and gases. Furthermore, some seals need to be electrically insulating.

Traditionally, SOFC stack gaskets have been either bonding gaskets (e.g. glass/glass-ceramic or brazes) or non-bonding (compressible) gaskets (For example, see "A review of sealing technologies applicable to solid oxide electrolysis cells" P. Lessing, Journal of Materials Science, 2007, 42 (10), 3465-3476). More recently, multiple material gaskets have been developed. These gaskets combine properties and materials from both compressible gaskets and bonding gaskets.

The bonding gaskets contain primarily glass and glass-ceramics and they operate by mechanically and chemically bonding to the relevant mating surfaces of the fuel cell. The glass seals are designed to soften and viscously flow above the SOFC operating temperature to provide hermetic sealing. When the SOFC is cooled back down to the operating temperature the glass seals solidify to form a rigid, bonded seal.

Generally, glass compositions for the application of the glass seals include an organic solvent such as terpineol and/or an organic polymeric vehicle. However, such compositions are undesirable generally due to VOC content. In addition, contamination of the fuel cell with such substances is also possible.

US 2013/108946A and US 2012/318022A describe glass compositions for fuel cells having an organic binder carrier vehicle, the binder optionally comprising a dispersant compound such as terpineol and solvents such as ethanol. Likewise U.S. Pat. No. 6,656,625B refers only to organic binder carrier vehicles.

It would therefore be advantageous to use water based glass coating compositions. However, a problem with such compositions for high temperature glass coating compositions is that desirable glasses have been unexpectedly found to harden and set shortly after mixing of the glass with water.

It is therefore an object of at least one aspect of the present invention to address one or more of the above mentioned, or other, problems. In particular, it is an object of the present invention to provide water based glass coating compositions for such fuel cell gaskets.

According to a first aspect of the present invention there is provided a glass coating composition for a fuel cell gasket comprising:
   a glass component effective to form an alkaline solution in the presence of an equivalent amount of water by weight;
   a binder component;
   a liquid carrier which is greater than 50% by volume water;
characterised in that the composition further comprises a retarder effective to inhibit hardening of the composition.

Surprisingly, it has been found that alkaline glasses, more specifically, glasses which form an alkaline solution in water, tend to stiffen and harden in an aqueous environment rendering them useless as glass coating compositions due to the exceptionally short storage stability. The inventors have surprisingly found however that alkali retarders are effective in such aqueous environments to retard the setting process. Such retarders are known in concrete applications but it is surprising that they are effective in this different chemical environment of an aqueous glass powder.

Typically, the retarder inhibits alkaline effected hardening of the composition. As such, generally the retarder extends the setting time of the composition and prolongs the shelf life of the composition.

Accordingly, the composition of the present invention is a storage stable composition.

The retarder may be selected from one or more organic or inorganic retarders. Suitable organic retarders are: one or more of those based on lignin, for example lignosulfonates, including calcium, sodium and/or ammonium salts thereof; hydroxycarboxylic (HC) acids, such as gluconic acid, citric acid, tartaric acid or malic acid and salts thereof, suitably water soluble salts thereof; vinyl polymers, such as sulfonate, carboxylic and/or aromatic ring group containing vinyl polymers, such as sulfonate-functionalized acrylamide-acrylic acid co-polymers; saccharides, i.e. monosaccharides, disaccharides and polysaccharides, for example, carbohydrates, such as alkali carbonates, disaccharides such as sucrose and polysaccharides such as celluloses, for example, hydroxyethyl cellulose (HEC) and/or carboxymethyl hydroxyethyl cellulose (CMHEC); and/or derivatives thereof, or mixtures thereof. Suitable inorganic retarders are: one or more of zinc oxide; phosphates, such as salts of phosphoric, poly-phosphoric and phosphonic acids, such as amino tris(methylene phosphonic acid), ethylenediamine tetra(methylene phosphonic acid), diethylenetriamine penta (methylene phosphonic acid), and monobasic calcium, zinc or magnesium phosphate; fluorates; borates, such as alkali borates, for example, sodium metaborate, sodium tetraborate (also known as borax), and/or potassium pentaborate; and/or derivatives thereof, or mixtures thereof.

Suitable retarders are those containing a hydroxyl group including the hydroxycarboxylic acids and their salts such as citric acid, tartaric acid, salicyclic acid, gluconic acid, glucoheptonate and glucono-delta-lactone; sugars such as mono and disaccharides or hydroxylated polysaccharides such as HEC and CMHEC; and boric acid and its salts such as borax.

Due to VOC content and potential problems with carbonisation, preferred retarders are inorganic retarders, more preferably, inorganic retarders with no VOC content. Typically, the retarder is a carbon-free inorganic retarder.

Preferably, the retarder is water soluble. In a preferred embodiment, the retarder is selected from one or more water soluble borates such as borax; hydroxycarboxylic acids;

mono and disaccharides; soluble carbohydrates and/or soluble celluloses. An especially preferred retarder is a borate, such as borax.

A commercially available retarder that is suitable for use in the present invention is, for example, Borax (available from Rio Tinto Minerals).

Preferably, the level of retarder in the composition is between 0.02 to 20 wt %, such as between 0.05 to 10 wt %, for example between 0.5 to 5 wt % or 1 to 5 wt %. Preferably, the level of retarder in the composition is at least 0.02 wt %, such as at least 0.1 wt %, for example at least 0.4 wt % or at least 0.75 wt %. Preferably, the level of retarder in the composition may be up to 25 wt % retarder, such as up to 15 wt %, 8 wt % or 6 wt %.

Preferably, the dry composition, i.e. not including the liquid carrier, comprises between 0.05 to 20 wt % retarder, such as between 0.1 to 10 wt % retarder, for example 0.5 to 7 wt % or 0.5 to 2 wt % retarder. Preferably, the dry composition comprises at least 0.01 wt % retarder, such as at least 0.5 wt %, for example at least 1 wt % retarder. Preferably, the dry composition comprises up to 20 wt % retarder, such as up to 15 wt % retarder.

Suitably, the retarder component is generally not part of the glass component and is added to the composition.

Preferably, the retarder is dissolved in the composition in one of the above amounts.

In use, any organic binder or organic retarder in the composition will burn-off. Accordingly, preferred levels of inorganic retarder residue left in the composition in use, i.e. not including the liquid carrier or binder, comprise between 0.05 to 20 wt % retarder, such as between 0.1 to 10 wt % retarder, for example 0.5 to 7 wt % or 0.5 to 3 wt % retarder. Preferably, the composition in use in a fuel cell comprises at least 0.01 wt % retarder, such as at least 0.5 wt %, for example at least 1 wt % retarder. Preferably, the composition in use in a fuel cell comprises up to 20 wt % retarder, such as up to 15 wt % retarder.

The glass component may be selected from any alkaline glass material that forms an alkaline solution as defined in the first aspect herein. The glass component may be of an amorphous, crystalline or semi-crystalline character. In general, the coating layer may comprise any degree of amorphous or crystalline character depending upon the application and may be of any composition in the continuum between a material of a completely crystalline or amorphous nature. Furthermore, the coating may be altered to higher proportions of crystalline content over time by, for example, exposure to elevated temperatures. Suitably, the glass component comprises glass or a mixture of glass and ceramic material. The materials are selected so that the coating is sufficiently deformable at the chosen operating temperature and compressive stress of the fuel cell stack. Where the coating material includes crystalline character this may be in the range 5-70% w/w, more typically, 10-60%, most typically, 20-50% w/w at operating temperatures using XRD and the Rietveld Method.

Usually, the glass component comprises amounts of Si, Al, Mg, Na, Ca, Ba and/or B in various oxidised forms. For example, typically the glass comprises one or more of the compounds selected from $SiO_2$, $Al_2O_5$, $B_2O_3$, BaO, $Bi_2O_3$, CaO, $Cs_2O$, $K_2O$, $La_2O_5$, $Li_2O$, MgO, $Na_2O$, PbO, $Rb_2O$, $Sb_2O_5$, SnO, SrO, $TiO_2$ $Y_2O_3$ and/or ZnO. For example a glass component selected from one or more of BaO, ZnO, $B_2O_3$, CaO and/or $Al_2O_3$, such as one or more of BaO, $B_2O_3$, $Al_2O_3$ and/or CaO. It will be understood by the skilled man that the exact composition of the coating layers, and particularly the glass component, will depend upon the operating conditions of the fuel cell to which the composition is to be applied, such as the operating temperature. Suitably, the coating layers comprise one or more suitable glass and/or glass-ceramic materials suitable for use in coatings for fuel cell applications.

Preferably, the glass component comprises particles of glass material, such as glass powder. Suitably, the glass component has been ground. For example, the particles may be substantially non-elongated particles. Suitably, the glass component is substantially not in the form of glass fibre.

Preferably, the particles of the glass component have a do of between 1 to 40 µm, such as 2 to 35 µm or 3 to 30 µm. The particles of the glass component may have a $d_{99}$ of between 30 and 180 µm, such as between 35 and 155 µm, for example between 40 and 150 µm.

Preferably, the particles of the glass component have a $d_{50}$ of at least 0.5 µm, 1 µm, such as at least 2 µm or 3 µm. Preferably, the particles of the glass component have a $d_{50}$ of up to 50 µm, such as up to 40 µm, or up to 35 µm, or up to 30 µm.

Preferably, the particles of the glass component have a do of at least 20 µm, such as at least 30 µm or at least 35 µm, or at least 40 µm. Preferably, the particles of the glass component have a $d_{99}$ of up to 200 µm, such as up to 180 µm, or up to 155 µm, or up to 150 µm.

Various commercially available glass components that are suitable for use in the present invention are, for example, various glass components available from Nihon Yamamura Glass Co., Ltd; such as glass components containing BaO, ZnO, $B_2CaO$ and $Al_2O_3$; and Schott GM31107, available from Schott AG 84028 Landshut, Germany, such as a glass component containing BaO, $B_2O_3$, $Al_2O_3$ and CaO.

Preferably, the alkaline solution formed by the glass has a pH of at least 8, more preferably, at least 9, most preferably, at least 9.5, for example, at least 10, such as at least 11 in a 1:1 w/w ratio glass:water at 25C.

Typically, the glass component is of the type which hardens and sets in water, for example in an equivalent amount of water by weight.

Typically, a brush-type coating composition of the present invention may have 30-90 wt % glass component in the formulation, more typically 40-80 wt %, most typically 50-75 wt %. Accordingly, in this case, the binder component and liquid carrier component substantially provide the balance of the coating formulation. In a spray-type formulation, the glass component may provide 10-70 wt %, more typically, 20-60 wt %, most typically, 30-50 wt % of the composition with the balance again substantially made up of the binder component and liquid carrier component. Accordingly, in general, the glass component is present in the range 10-90 wt %, more preferably, 20-80 wt %, most preferably, 30-75 wt % of the composition.

Preferably, the level of the glass component in the dry composition is in the range of between 60 to 99.45 wt %. For example, the level of the glass component may be in the range of between 70 to 98.5 wt %, such as between 80 to 98.5 wt % or between 90 to 97.5 wt %. Typically, the dry composition comprises the glass component in an amount of at least 65 wt % by weight, such as at least 75 wt %, for example at least 85 wt % or 95 wt %.

In use, after organic burnoff, the level of the glass component may be in the range of between 70 to 99.95 wt %. For example, the level of the glass component may be in the range of between 50 to 99 wt %, such as between 80 to 99 wt % or between 90 to 99 wt %. Typically, after organic burnoff the composition comprises the glass component in an amount of at least 65 wt % by weight, such as at least 75 wt %, for example at least 85 wt % or 95 wt %.

Preferably, the ratio of glass component:retarder is in the range of between 40:1 and 90:1 w/w, such as 50:1 and 80:1 w/w, for example 60:1 and 70:1 w/w. Typically, the ratio of glass component:retarder is at least 40:1 w/w, such as at least 50:1 w/w, for example at least 60:1 w/w. Typically, the ratio of glass component:retarder is up to 90:1 w/w, such as up to 80:1 w/w, for example up to 70:1 w/w.

Suitably, the binder component is stable under alkaline conditions, such as the pH of the solution formed by the glass, for example, at least pH 8, more typically, at least 9, most typically, at least 9.5, for example, at least pH10, or at least pH11.

Generally, the binder is selected from one or more of an organic and/or polymeric binder(s). A mixture of binders may be required to suit the application. Typically, the binder is water dispersible.

When the binder contains a polymeric binder it may be selected from any binder which substantially burns off prior to stack operation. Binders which leave a minimal carbon deposit are preferred. Examples may be selected from one or more of cellulose binders; acrylate homo or copolymers; vinyl acetate homo or copolymers, ethylene copolymers; and/or polyvinyl butyral. Suitable acrylic homo or copolymers are known to the skilled person for example, those defined in EP 1566368A2, paragraphs [0024] to [0028].

Preferably, the binder is selected from one or more acrylate homo or copolymers or vinyl acetate homo or copolymer. Typically the binder is one or more acrylate homo or copolymers.

Preferably, the level of binder in the composition is in the range 1 to 20 wt %, such as 2 to 15 wt %, for example 3 to 10 wt %. Preferably, the level of binder in the composition is at least 0.1 wt %, such as at least 0.5 wt %, for example at least 1.5 wt %. Preferably, the level of binder in the composition is up to 25 wt %, such as up to 15 wt %, for example up to 12 wt %.

Preferably, the level of binder in the dry composition is in the range 0.5 to 20 wt %, such as 1 to 15 wt %, for example 2 to 10 wt %. Preferably, the level of binder in the dry composition is at least 0.05 wt %, such as at least 0.1 wt %, for example at least 0.5 wt %. Preferably, the level of binder in the dry composition is up to 20 wt %, such as up to 18 wt %, for example up to 12 wt %.

Various commercially available binders that are suitable for use in the present invention are, for example, Plextol D498, a stabilised acrylic copolymer from Syntomer; and Emultex 5717, a stabilised vinyl acetate/veova from Syntomer.

As detailed above, the coating composition includes a liquid carrier component which is generally predominantly water, for example, at least 70% by volume water, more typically, at least, 80%, most typically, at least 90% by volume water, for example, at least 95% by volume. Generally, no other liquid carriers are present in the composition at 25° C.

Preferably, the liquid carrier component is present in the range 1-55% of the composition, more typically 10-45% w/w, most typically, 10-25% w/w. Preferably, the composition comprises a liquid carrier component in an amount of at least 10 wt %, such as at least 20 wt %, for example at least 25 wt %. Preferably, the composition comprises a liquid carrier component in an amount of up to 60 wt %, such as up to 50 wt %, for example up to 40 wt % or 30 wt %.

The coating composition may additionally comprise further additives known to the skilled person, for instance, one or more of an emulsifier; a wetting agent, a dispersing agent, such as an acrylic polymer salt; a thickening and/or suspending agent, such as a hydroxyethyl cellulose; an anti-settling agent such as xantham gum; pigments, such as organic pigments; and/or a thixotropic agent may be included.

Preferably, the level of suspending agent in the composition is in the range 0.002 to 4 wt %, such as 0.01 to 2 wt %, for example 0.03 to 1 wt % or 0.04 to 0.5 wt % or 0.04 to 0.1 wt %. Preferably, the level of suspending agent in the composition is at least 0.001 wt %, such as at least 0.005 wt % or at least 0.01 wt %, for example at least 0.03 wt % or at least 0.04 wt %. Preferably, the level of suspending agent in the composition is up to 4 wt %, such as up to 2 wt %, for example up to 1 wt % or up to 0.5 wt %.

Preferably, the level of suspending agent in the dry composition is in the range 0.005 to 5 wt %, such as 0.01 to 3 wt %, for example 0.03 to 1 wt % or 0.04 to 0.5 wt %, or 0.04 to 0.1 wt %. Preferably, the level of suspending agent in the dry composition is at least 0.002 wt %, such as at least 0.005 wt %, for example at least 0.01 wt % or at least 0.03 wt % or at least 0.04 wt %. Preferably, the level of suspending agent in the dry composition is up to 5 wt %, such as up to 3 wt %, for example up to 1 wt % or up to 0.5 wt %.

Preferably, the level of anti-settling agent in the composition is in the range 0.002 to 4 wt %, such as 0.01 to 2 wt %, for example 0.03 to 1 wt % or 0.04 to 0.5 wt % or 0.04 to 0.1 wt %. Preferably, the level of anti-settling agent in the composition is at least 0.001 wt %, such as at least 0.005 wt % or at least 0.01 wt %, for example at least 0.03 wt % or at least 0.04 wt %. Preferably, the level of anti-settling agent in the composition is up to 4 wt %, such as up to 2 wt %, for example up to 1 wt % or up to 0.5 wt %.

Preferably, the level of anti-settling agent in the dry composition is in the range 0.005 to 5 wt %, such as 0.01 to 3 wt %, for example 0.03 to 1 wt % or 0.04 to 0.5 wt %, or 0.04 to 0.1 wt %. Preferably, the level of anti-settling agent in the dry composition is at least 0.002 wt %, such as at least 0.005 wt %, for example at least 0.01 wt % or at least 0.03 wt % or at least 0.04 wt %. Preferably, the level of anti-settling agent in the dry composition is up to 5 wt %, such as up to 3 wt %, for example up to 1 wt % or up to 0.5 wt %.

Preferably, the level of pigment in the composition is in the range 0.1 to 20 wt %, such as 0.5 to 15 wt %, for example 1 to 10 wt % or 1 to 5 wt %. Preferably, the level of pigment in the composition is at least 0.05 wt %, such as at least 0.1 wt % or at least 0.5 wt %, for example at least 1 wt %. Preferably, the level of pigment in the composition is up to 25 wt %, such as up to 15 wt %, for example up to 12 wt % or up to 8 wt %.

Preferably, the level of pigment in the dry composition is in the range 0.1 to 20 wt %, such as 0.5 to 15 wt %, for example 1 to 10 wt % or 1 to 5 wt %. Preferably, the level of pigment in the dry composition is at least 0.05 wt %, such as at least 0.1 wt %, for example at least 0.5 wt % or at least 1 wt %. Preferably, the level of pigment in the dry composition is up to 20 wt %, such as up to 18 wt %, for example up to 12 wt % or up to 10 wt %.

Advantageously, the use of pigments allows for the coating to display a colour during application. Commonly, without pigmentation the coating would be transparent and due to the relative thinness of the coating it can be difficult to identify to which portions of the stack or gasket the coating has been applied. However, the use of a pigment allows for easy identification of the areas of the stack or gasket covered by the coating. Colour display also allows a user to distinguish between coated and non-coated gasket stock. Further, different types of compositions, for example for use at different fuel cell operating temperatures may be differently coloured, allowing for the different compositions to be distinguished. Furthermore, the use of organic pigments means that during organic burn-off the pigment will be removed from the coating, causing the coating to become transparent and thus removing possible causes of degradation in the coating during.

Preferably, it will be appreciated that the range, as well as the lower and upper limits, for the levels of the retarder, glass component, binder, liquid carrier and other additives herein may be combined in any combination within the context of the invention.

In use, the liquid carrier component generally evaporates during drying and the binder component in the coating layer and any remaining liquid carrier component is removed due to the heating up of the fuel cell prior to use. Accordingly, after production and initial drying the gasket includes binder component, whereas in use, the binder component is substantially removed.

According to a second aspect of the present invention there is provided a gasket for sealing two mating surfaces of a fuel cell comprising a core layer, said core layer interposed between a first and second coating layer according to the composition of the first aspect of the present invention.

In addition, the invention extends to a gasket according to the second aspect from which the coating layer liquid carrier has essentially been removed by drying. Still further, the invention extends to a gasket according to the second aspect from which the coating layer binder has been removed or decomposed in use.

Preferably, the core layer is a resiliently deformable core layer. Typically, the resilient layer may contain one or more of platelet fillers such as exfoliated vermiculite and/or mica, for example the core layer may contain chemically exfoliated vermiculite (CEV) and/or thermally exfoliated vermiculite (TEV). Preferably, the resilient core layer contains CEV.

Suitably, the coating layers cover at least a part of the surface of the core layer. Generally, the coating layers are contiguous with the core layer so as to cover substantially the entire surface of the core layer. However, the coating layers may overlap the edges of the core layer to merge at their respective peripheries to thereby seal the core layer within the coating layers. Preferably, the coating layers form the outer layers of the gasket such that the coating layers are in contact with the respective mating surfaces, in use, more preferably, the gasket layers are arranged such that substantially none of the core layer contacts the mating surfaces in use. However, it is also possible to have less than 100% coating coverage of the core layer and optionally for some of the core layer to also contact the mating surfaces in use.

Preferably, the gasket of the present invention is for use in a SOFC or SOEC. The gasket is preferably a gasket for use in a SOFC or SOEC to reduce gas leakage.

Advantageously, it has surprisingly been found that gaskets according to the second aspect of the present invention display improved leakage rates, in use. It was also surprisingly found that the improved leakage rates are maintained after thermal cycling, and, moreover, may actually improve after a series of thermal cycles. Low leak rates have furthermore been obtained over a wide range of gas pressures and over a wide range of temperatures. Furthermore, advantageously, although enhanced sealing is found at all levels of compressive stress, it has been found that gaskets according to the second aspect of the present invention provide particularly improved sealing properties at relatively low compressive stress, typically, less than 0.5 MPa, for example at 0.1 MPa. By operating a SOFC or SOEC at low compressive stress, less bulky compression systems for stack modules can be used allowing for more design freedom and efficiency improvements. Furthermore, with lower surface stresses, thinner interconnect plates can be used rather than etched or machined plates and more advanced flow geometries are possible.

The core layer is intended to be more compressible than the coating at lower temperatures, in particular below the glass transition temperature of the coatings. This may allow for the thermo-mechanical stresses to be reduced compared to an all-glass seal. Preferably, the core layer is compressible in the direction perpendicular to its facing surfaces. As mentioned above, the core layer of the gasket may comprise exfoliated vermiculite.

Preferably, the exfoliated vermiculite is chemically exfoliated vermiculite (CEV). CEV is formed by treating the ore and swelling it in water. In one possible preparation method, the ore is treated with saturated sodium chloride solution to exchange magnesium ions for sodium ions, and then with n-butyl ammonium chloride to replace sodium ions with n-$C_4$—$H_9NH_3$ ions. On washing with water swelling takes place. The swollen material is then subjected to high shear to produce an aqueous suspension of very fine (diameter below 50 μm) vermiculite particles.

The water may also be removed from the suspension to form dry CEV particles. Preferably, the dry CEV is prepared by a suitable drying technique such as those well known to the skilled man. Suitable drying techniques include cake drying and pulverising; film drying and pulverising; rotary hot air drying; spray drying; freeze drying; pneumatic drying; fluidised bed drying of partially dried solid; and vacuum methods including vacuum shelf drying.

Typically, the core layer of the present invention has a density prior to use of 1.7-2.0 g/cm$^3$, more typically, around 1.9 g/cm$^3$.

Preferably, CEV provides up to 100% w/w of the total exfoliated vermiculite in the core layer, typically, 80-100% w/w, more typically, 90-100%, generally approx. 100% CEV w/w total exfoliated vermiculite in the core layer. The core layer may also include dry derived CEV i.e. CEV added to the core composition in a dry state prior to formation and drying of the core gasket composition. However, generally the source of CEV is an aqueous dispersion thereof prepared directly from the vermiculite ore.

Preferably, the proportion of CEV is at least 30% w/w of the core layer, more preferably at least 35% w/w of the core layer.

Typically, the level of CEV falls within the range 30-70% w/w of the core layer, more typically, 35-65% w/w of the core layer, most typically 40-55% w/w of the core layer.

Preferably, the core layer is in the form of a foil of exfoliated vermiculite formed by calendering a wet dough composition or by drying after spreading a wet dough composition with a doctor blade.

The core layer may include further components besides exfoliated vermiculite. For example, the core layer may further comprise a suitable filler, such as one or more of a coarse, fine, very fine and/or plate-shaped filler. For example, the filler may be coarse filler having a $d_{50}$ of approximately 20 μm as determined by a Malvern Sizer 3601. The filler may be a very fine filler having a surface area of approximately 125 m$^2$/g, and/or the filler may be a finely ground filler having a surface area of approximately 7 m²/g, such as a plate-shaped filer. By "approximately" it is meant ±10%.

A preferred filler is talc. An example of coarse grain talc filler is Magsil Diamond D200 available from Richard Baker Harrison Limited IG1 4TQ, UK. Another example of a filler is the very fine synthetic silica filler VN2 available from Evonik Degussa GmbH, 60287 Germany. A yet further example of a suitable filler is the finely ground plate mica material MKT available from Minelco Ltd DE21 7BE.

An example of a suitable exfoliated vermiculite core material is Thermiculite 866 (available from Flexitallic).

In one preferred embodiment of the present invention the exfoliated vermiculite is 80%-100% w/w CEV and the proportion of CEV is at least 30% w/w of the core layer.

In other preferred embodiments of the present invention the exfoliated vermiculite is 80-100% w/w CEV; the proportion of CEV is at least 30% w/w of the core layer; the proportion of filler is at least 40% w/w of the core layer, the coatings layers are preferably in contact with the core layer, and the coating layer optionally has a thickness of between 0.1 and 50 μm; and optionally the gasket has an uncompressed thickness in the range 10-2100 μm.

Preferably, the proportion of filler is at least 40% w/w of the core layer, most preferably, at least 45% w/w of the core layer. Typically, the level of filler falls within the range 70-30% w/w of the core layer; more typically 65-35% w/w of the core layer, most typically 60-48% w/w of the core layer.

Typically, the core layer is in the range of 10-2000 μm thickness, more typically 100-1500 μm, most typically 100-1200 μm, such as 300-1000 μm.

As mentioned above, the gasket further comprises coating layers of the composition of the first aspect of the invention. The coating layers of the present invention are designed to hermetically seal the mating surfaces of the SOFC or SOEC and conform to the topography of the core layer of the gasket. The coating layers are further operable to accommodate surface imperfections in the mating surfaces thus acting to substantially seal direct leak paths. Furthermore, when one or more of the coating layers are arranged directly adjacent to the core layer, the coating layer(s) may act to accommodate surface imperfections in the core layer material, thus also substantially sealing direct leak paths in the core layer. Accordingly, the coating layers preferably conform to the topography of the core layer. As such, preferably the coating layers are arranged in the gasket such as to be in contact with the core layer, preferably, by direct coating of the core layer to form an immediate first and second coat on opposed facing surfaces of the core layer. The coating layers of the invention are particularly advantageous due to surface imperfections and striations being typical on the surface of the core layer of the present invention.

Typical densities of the glass coatings in use in a fuel cell after organic burnoff are in the range 2.5-7.5 g/cm³, such as the range 3 to 6.5 g/cm³.

Weight per unit area (mg/cm²) of the coatings will depend on thickness of the coatings applied to the gasket but is typically in the range 0.2 to 10 mg/cm² after organic burnoff, such as the range 3 to 8 mg/cm³.

Suitably, the coating layer may initially have a viscosity of 1 to $10^4$ Pa·s when the temperature in the stack is at the operating temperature. However, over time, the amorphous phases may increasingly crystallise leading to increases in viscosity at operating temperature.

The coatings of the present invention are adapted to be conformable to the core layer in such a manner that the coating fills the imperfections in the core layer surface and thereby seals leak paths. Generally, this takes place during operating temperatures.

The type of glass in the glass component may be varied according to the desired operating temperature of the stack. For example, where a fuel stack has a particular operating temperature, the coating composition may be selected so that the viscosity of the materials are tailored to the stack operating temperature so that the coating conforms to the adjacent surfaces at those temperatures. It is preferable that the glass component has a wetting-flowing temperature in the region of or above the operating temperature of the fuel cell in which the seal is to be used. For example, where a fuel cell stack has an operating temperature of 700° C. a glass component having a wetting-flowing temperature range of around 700 to 800° C. may be used. Accordingly, the preferred required sealing temperature of the glass component is above the softening temperature, more typically, between the softening and hemisphere temperatures of the coating as the hemisphere temperature is generally indicative of the onset of the wetting phase. Fuel cell operating temperatures vary depending on the nature of the stack and may be between 500° C. and 1000° C. but are generally between 550° C. and 900° C. and generally the coating composition should still provide an effective seal at the lowest operating temperature. Accordingly, the preferred softening temperature range of the glass component is between 450 and 950° C., more preferably, 500-900° C. to meet the requirements of various fuel cells. The hemisphere temperature range may be 10-500° C. higher than the ranges for the softening temperature, more preferably, 10-200° C. As fuel cell operating temperatures for a given fuel cell may vary in use, the glass component should preferably be operable over these temperatures. However, it is preferred in some embodiments in the present invention for the hemisphere temperature to be below the upper operating temperature of the fuel cell so that the wetting phase or even the flowing phase may be reached during initial cycling as this will assist sealing between the core and coating layers. The flowing temperature of the glass component may be 5-100° C. above the hemisphere temperature ranges. Typical flowing temperature ranges are 800-1500° C. but for glass-ceramic composites in the range 750-1100, more preferably, 800-1050° C. It will be appreciated that the pressure on the stack will also affect the sealing, hemisphere and flowing temperature. However, the temperature ranges above may be determined by a hot stage microscope at atmospheric pressure.

Preferably, each coating layer has a thickness of between 0.1 and 50 μm, more typically, 0.5 and 25 μm, or 1 to 20 μm after burnoff of the organics.

Although multiple coats of coatings composition may be applied, preferably only one coat of coating composition is applied for each coating layer in the gasket.

Advantageously, a low viscosity of the glass coating layers permits good wetting of adjacent surfaces as well as penetration to the exfoliated vermiculite pores.

According to a third aspect of the present invention there is provided a fuel cell comprising a gasket for sealing two mating surfaces of the fuel cell, the gasket being in accordance with the second aspect of the present invention.

Preferably, the fuel cell is a solid oxide fuel/electrolyzer cell (SOFC and SOEC).

According to another aspect of the present invention there is provided use of a glass coating composition according to the first aspect of the invention in fuel cell gaskets.

According to another aspect of the present invention there is provided a solid oxide cell or a solid oxide cell component comprising one or more gaskets according to any of the aspects of the present invention.

Preferably, the solid oxide cell comprises at least one gasket according to the second aspect of the invention. Optionally, the solid oxide cell may comprise gaskets between one or more of the cell electrolyte and cathode; the electrolyte and anode; the cathode and anode; the cell and an interconnect, an interconnect and an interconnect; an interconnect and an endplate; a cell and an endplate; and/or a cell and a cell.

According to another aspect of the present invention there is provided use of a gasket according to any of the aspects of the present invention to improve sealing properties in a solid oxide cell, particularly a SOFC or SOEC.

According to another aspect of the present invention there is provided a method of producing a solid oxide cell or of sealing a solid oxide cell comprising incorporating at least one gasket according to any of the aspects of the present invention into the solid oxide cell.

The mating surfaces of the fuel cell may be formed of the same or different materials. Preferably, the mating surfaces are formed of metal or ceramic. Most preferably, the mating surfaces are formed of steel such as high temperature ferritic steel. A suitable stainless steel is Crofer 22 APU which forms a chromium-manganese oxide layer which is very stable up to 900° C.

Advantageously, the superior performance of gaskets according to the second aspect of the invention allows the use of lower surface stresses whilst still achieving gas sealing. Accordingly, use of the invention also allows the use of parts for the fuel cell with lower stress limits. Such parts include thin interconnect plates which can be conveniently produced by pressing rather than etching or machining, for example. This allows for greater design freedom and more advanced flow geometries in the fuel cell. Typically, the thin metal plates of the fuel cells of the invention are in the range 0.1 to 1.5 mm thickness, more preferably, 0.1 to 1 mm thickness, most preferably, 0.1 to 0.5 mm thickness.

According to another aspect of the present invention there is provided a method for producing a gasket according to the second aspect of the present invention comprising the steps of;
 a. coating the glass composition of the first aspect onto each of the opposed surfaces of a gasket core layer to form coating layers thereon;
 b. locating the coated gasket in a fuel cell between mating surfaces to be sealed;
 c. optionally, heating the gasket to remove any remaining volatile organic components;
 d. optionally, heating the gasket to effect sintering of the coating layers;
 e. optionally, further heating to effect wetting of the coating layers.

The gasket core layer may be selected from the gasket core layers defined herein. Preferably, the core layer comprises exfoliated vermiculite, more preferably, chemically exfoliated vermiculite.

The method may include the step of forming, preferably cutting, the core layer into the required gasket shape prior to or after coating step a. Optionally, the forming, more preferably, cutting step takes place prior to step a. In this manner recycling of any unused parts of the core layer is more easily effected as separation from the coating layer is then avoided.

The coating layers may be applied to the core layer in any manner known to the skilled man. Preferably, the coating is applied in the form of a liquid suspension or paste-type formulation. For example, the coating layers may be applied by spraying, brushing, spatula, roller, draw bars, tape or screen printing. The method of application will dictate to a certain extent the content of the coating formulation.

It will be clear to the skilled man that the contents and the proportions of the coating composition may be altered according to the desired properties of the formulation, such as thickness, adherence etc.

The coating composition may be formed by any method known to the skilled man. Usually, the coating composition can be prepared by mixing the binder component, liquid carriers, retarder and glass component. Suitably, the glass component and retarder are different components and are added separately, or pre-combined from separate components.

The coated core layer may be dried at ambient temperature. The length and temperature of the drying step will depend, for example, upon the content of the coating composition and the thickness of the coating layer. In one embodiment, a proportion of liquid carrier component is left in the coating layers after drying. Advantageously, the coating layers in this form can serve as a low temperature adhesive, and as such serve to improve the ease of handling the assembled components prior to first use.

It has advantageously been found that compositions according to the present invention are easier to mix than prior art compositions. For example, prior art compositions using organic carriers, such as terpineol, may have required mixing for up to 12 hours. Compositions according to present invention have been found to be in a suitable form after a few minutes of mixing, such as after 30 minutes of mixing, for example 20 minutes, 10 minutes, 5 or 2 minutes of mixing, such as mixing at normal operating conditions with IKA overhead stirrers including RW basic lab egg mixer or RW 20 Digital mixer. Furthermore, it has been found that compositions according to the present invention are easier to dry than prior art compositions. For example, prior art compositions using terpineol may require drying by heating for up to 20 minutes in an oven. In contrast compositions according to the present invention have been found to dry in a suitable timescale without a requirement for oven heating. For example, the coating may be suitably dry after drying in ambient temperature, such as between 18 and 25° C., for 20 minutes, for example 10 or 5 minutes.

The gasket may be cut into the required shape before coating, but is typically cut into the required shape after coating and initial drying by any suitable method known to the skilled man.

Preferably, the coating layers are conformed to the core layer before stack assembly and heat-up.

The conditions of the heat treatment steps (c) to (e) in this further aspect of the invention are preferably optimised such that the coating layers accommodate any imperfections in the surface of the core layer.

The heat treatment process may be carried out using a step-wise, continuous or mixed step-wise and continuous temperature gradient. For example, the temperature may be increased at a relatively steady rate of between 20 to 100 K/h, more preferably between 50 to 70 K/h, most preferably between 55 to 65 K/h. Preferably, the heat treatment is conducted in an atmosphere of air.

Preferably, the heat treatment is carried out in a step-wise manner, meaning the temperature is raised and substantially held at a specific raised level for a period of time before being further raised and substantially held, and so on until heating is complete. As such, in one embodiment, the heating may involve maintaining at a temperature that allows for a controlled burnout of any organic materials. A controlled burnout is favoured in order to help prevent carbon formation. The temperature may then be raised to a further higher temperature at which point wetting and sintering of the coating occurs.

With regard to step (c), this step may comprise a dwell period during heat up of the stack. The dwell period may be between 350-500° C., such as above at least 350° C., such as up to a temperature of 500° C., over, for example an hour, to substantially burn off remaining organic components.

Typically, the temperature applied at step (d) is higher than the temperature of step (e), as well as higher than the operating temperature of the stack. For example, the temperature of step (d) may be 40-70° C. higher than the operating temperature of the stack. As such, the use of a sintering step may require a separate heating regime for the gasket before the temperature can be adjusted to the stack operating temperature. Advantageously, gaskets according to the present invention may not require the sintering of step (d). For example, gaskets according to the present invention may not require a sintering step or require heating above the operating temperature of the stack, such as when the stack has an operating temperature of around 700° C. or greater. As such, typically, the temperature of the stack may be raised according to only the requirements of the stack. Gaskets according to the present invention may not require special heating regime independent of the temperature requirements of the stack.

Advantageously, the heat treatment allows the coating layer to fill the core's surface imperfections. Furthermore, the coating substantially seals direct leak paths. In one embodiment, the coating layers may be operable to seal cracks in the core that form during thermal cycling.

According to another aspect of the present invention there is provided a method for producing a gasket according to the second aspect of the present invention comprising the steps of,
 a. coating a glass composition according to the first aspect of the present invention onto each of the mating surfaces to be sealed;
 b. locating a gasket core layer between the coated mating surfaces to be sealed;
 c. mating the coated surfaces and interposed gasket core layer together;
 d. optionally, heating the gasket to remove any remaining volatile organic components;
 e. optionally, heating the gasket to effect sintering of the coating layers;
 f. optionally, further heating to effect wetting of the coating layers.

The coating layers of this aspect of the present invention may be in accordance with, prepared and applied to the mating surfaces according to any of the coating compositions and methods described in relation to the coating layers of any of the aspects of the present invention. Preferably, the coating layers are applied to the mating surfaces in the form of a paste. Preferably, the method of applying the glass composition to the mating surfaces is by extrusion such as beading by extrusion.

Steps (d) to (f) may be carried out as described according to steps (c) to (e) of the preceding aspect of the present invention and the optional features thereof as described above.

The method may include the step of forming, preferably cutting, the gasket core layer into the required gasket shape prior to locating it between the coated mating surfaces to be sealed.

Advantageously, the method according to this aspect permits even greater material efficiency in the production of gaskets according to the present invention. The shape of the gasket is generally dictated by the shape of the mating surfaces, however, the core layer material is commonly produced in large sheets. As such, shaping of the glass coated core layer sheets may result in cut-offs which can go to waste. Accordingly, by applying the glass composition initially to the mating surfaces, wastage of the coating composition is avoided. Furthermore, in this manner recycling of the unused parts of the core layer is more easily effected.

A gasket according to the aspects of the present invention comprises a core layer interposed between coating layers. Preferably, the coating layers of the gasket are arranged substantially immediately adjacent to the core layer and, typically, in bonded contact therewith. Thus, the coating layers are preferably in continuous contact with the core layer so that no further layer is interposed therebetween. The core layer material may be selected from those defined herein. Preferably, the core layer comprises exfoliated vermiculite, more preferably, chemically exfoliated vermiculite.

Typically, the coated gasket of the present invention has an uncompressed thickness in the range 10-2100 μm, more typically 50 to 1500 μm, most typically 300 to 1000 μm.

Usually, the coating layers will be reasonably fluid and conformable at the operating temperature of the stack. However, at lower temperatures the coating layers can solidify, for example during thermal cycling. As such, the thermal expansion coefficients (CTE) of the coating layers, the core layer and the mating surfaces may be substantially the same. Typically, the mating surfaces of the cell have a CTE in the range $10\text{-}13 \cdot 10^{-6} K^{-1}$ during operating temperatures. Matching of the CTE of the coating material and the mating surfaces is particularly advantageous at these temperatures but also more particularly below the operating temperature and therefore below the Tg of the coating material to avoid damage to the seal during thermal cycling. Suitably, the coating material has a CTE relative to the mating surfaces of $+/-2 \cdot 10^{-6} K^{-1}$, more preferably, $+/-1.5 \cdot 10^{-6} K^{-1}$ between 600-1000° C.

In general, the composition may be applied as a brush-type coating or a spray-type coating formulation. When the composition is applied by spraying, the composition will typically comprise a high level of liquid carrier. For reasons of delivery, the spray-type coating compositions require higher levels of liquid carrier than the brush-type coating compositions. As such, when the composition is applied with a brush-type composition, the composition will generally comprise a reduced level of liquid carrier. The brush-type coating compositions are generally suitable for all the non-spray application methods.

According to another aspect of the present invention there is provided the use of a retarder to prevent hardening of a glass composition. Suitable retarders and glass compositions for this purpose are defined herein, particularly in the first aspect.

According to another aspect of the present invention there is provided the use of a retarder to inhibit hardening of a glass composition. Suitable retarders and glass compositions for this purpose are defined herein, particularly in the first aspect.

Definitions

By "storage stable" is meant that the composition does not substantially harden under normally acceptable storage conditions of temperature and time i.e. between 5 and 30° C. and 1 to 7 days, more typically, 15 to 25° C. and 1 to 5 days.

The term "liquid" herein does not require definition because it is well understood by the skilled person. Typically, the term liquid is applicable to the material or composition at least between 5 and 35° C., more typically, between 5 and 30° C.

The term 'solid oxide cell" herein includes a solid oxide fuel cell or a solid oxide electrolyzer cell.

Hemisphere temperature is the temperature at which the height of the sample is half of the diameter so it is an index of the approach of wetting.

The Hemisphere (or Half Sphere) temperature is reached when the height of the sample is half the width of the base.

For a better understanding of the invention, and to show how embodiments of the same may be carried into effect, reference will now be made, by way of example, to the following examples.

EXAMPLES

The following glass powders were tested:
1 VIOX V1467 (pH in 1:1 water dispersion 6-7)
2 VIOX V2289 (pH in 1:1 water dispersion 6)
3 FLX 102 (pH in 1:1 water dispersion 10)
4 FLX 101 (pH in 1:1 water dispersion 10)
5 Schott GM31107 (pH in 1:1 water dispersion 10.5)

Comparative Test

For a comparative test, the above glass powders were incorporated into the following composition:

| | |
|---|---|
| Glass powder | 100 |
| Dispex N40 | 1 |
| Water | 42 |
| 1% Natrosol | 1 |
| 1% Kelzan | 1 |

Dispex N40—wetting and dispersing agent comprising a solution of a sodium salt of methacrylic acid in water.
Natrosol—thickening and suspending agent comprising 1% hydroxyethylcellulose solution.
Kelzan—anti-settling agent comprising 1% xanthan gum solution.

Results of Comparative Test

Comparative Example 1 (Containing VIOX V1467)

After 2 hours separated into water layer above a packed sediment. Could be re-mixed with effort. No change after 24 hours and no solidification reaction.

Comparative Example 2 (Containing VIOX V2289)

After 2 hours separated into water layer above soft sediment. Easy to re-mix. No change after 24 hours and no solidification reaction.

Comparative Example 3 (Containing FLX 102)

Composition started to thicken almost immediately. Pasty consistency after two hours. After 24 hours the composition became a thick coagulated paste that was not recoverable.

Comparative Example 4 (Containing FLX 101)

After one hour the composition became pasty. After 24 hours the composition had become a very stiff paste which was unusable as a coating.

Comparative Example 5 (Containing Schott GM31107)

The composition went solid within minutes

As shown by the above examples, it has been found that alkaline glasses solidify quickly in aqueous dispersions, and as such show poor storage stability.

Inventive Test

For a test of compositions according to the present invention, the FLX 102 and FLX 101 glass powders were incorporated into the following composition in examples 1 and 2:

| | |
|---|---|
| Glass powder | 100 |
| Dispex N40 | 1 |
| Water | 42 |
| 1% Natrosol | 1 |
| 1% Kelzan | 1 |
| Borax | 1.5 |

Borax—retarder comprising disodium tetraborate.
Results of Inventive Test

Example 1 (Containing FLX 102)

After two hours the composition formed a packed sediment that could be remixed. The composition was in the same form after 24 hours with no solidification. After 48 hours there was still no solidification.

Example 2 (Containing FLX 101)

After two hours there was no change in the form of the composition. After 48 hours there was some separation but the composition could be readily remixed and no solidification was found.

In further inventive example 3, the Schott GM31107 glass powder was incorporated into the following composition:

| | |
|---|---|
| Glass powder | 100 |
| Dispex N40 | 1 |
| Water | 42.5 |
| 1% Natrosol | 10 |
| 1% Kelzan | 10 |
| Borax | 1.5 |
| Plextol d498 | 10 |
| 10% yellow | 2.2 |
| 10% red | 0.4 |
| 10% black | 0.55 |

Plextol 0498—binder comprising an acrylic dispersion stabilised for application in high alkalinity system.
Yellow pigment—Gemsperse EP83 water based dispersion of organic pigment Yellow 83.
Red pigment—Gemsperse EX166 water based dispersion of organic red pigment.
Black pigment—Gemsperse EP7 water based dispersion of carbon black.

The above composition was formed by premixing water, Dispex and borax until borax was dissolved. The glass powder was then added with stirring. Preformed Natrosol and Kelzan solutions were then added with slow stirring, followed by the addition of Plextol with slow stirring and finally the pigments with slow stirring.
Results of Inventive Test Example 3 (Containing Schott)

The composition produced negligible thickening over 2 days. There was also negligible settling and any settling could be easily re-mixed. It was further found that the composition was suitable for application after 4 days when stored at ambient temperature and for 7 days when stored in a fridge.

The composition of example 3 was applied to a vermiculite gasket core layer using 50μ KBar (available from RK Print Coat Instruments Ltd, Litington, Royston, SG8 0QZ, UK) to give an even film which was air dried. The dried film was coherent and rub resistant with negligible chalking. The sheet was heated to 370° C. to burn-off the organics. Heating of the sheet to 700° C. produced a clear, transparent melted glass coating.

Further retarders were tested for their efficacy in retarding/stabilising the glass composition. The formulation used was as in example 3 except that borax was replaced as follows:—

Example 4. Ortho Boric Acid ($H_3BO_3$)

Boric acid is an extremely weak acid with a solution ph of 6.7 & is sufficiently soluble in water. Boric acid was dissolved in the water component at a level of 1.4 parts in the above formulation prior to adding the Dispex & glass. Viscosity was monitored as follows:—
Initial—low viscosity smooth liquid
6 hours—low viscosity smooth liquid
24 hours—low viscosity smooth liquid Example 5. Sugar (Sucrose)

Added at 1.4 parts to the above formulation by dissolving in the water prior to adding the glass.
Viscosity monitored as follows:—
Initial—low viscosity liquid
1 hr—sloppy paste
6 hr—thick paste—no grit
24 hr—thick paste—no grit
48 hr—stiff paste but still workable Example 6 Tartaric Acid Added at 1.4 parts to the above formulation by dissolving in the water prior to adding the glass.
Viscosity monitored as follows:—
Initial—low viscosity liquid
7 hrs—creamy consistency
24 hrs—creamy consistency
72 hrs—creamy consistency, no grit or flocculation Example 7 Salicylic Acid Added at 1.4 parts as previously described.
Viscosity monitored as follows:—
Initial—low viscosity liquid
45 mins—low viscosity liquid
24 hrs—sloppy paste, no grit, still workable As it can be seen from the above examples, aqueous compositions according to the present invention that contain alkaline glasses and a retarder show improved resistance to solidification in an aqueous dispersion, providing a substantial improvement in storage stability for these high temperature glasses.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket for sealing two mating surfaces of a fuel cell comprising a core layer, said core layer interposed between a first and second coating layer, each of the first and second coating layers comprising a glass coating composition comprising:
   a glass component capable of forming an alkaline solution in an equivalent amount of water by weight;
   a binder component;
   a liquid carrier comprising greater than 50% by volume water; and
   a retarder comprising a lignin, lignosulfonate, or a salt thereof; a hydroxycarboxylic acid or salt thereof; a vinyl polymer; a monosaccharide or disaccharide; a fluorate; a borate; or a derivative or mixture thereof.

2. The gasket of claim 1, wherein the core layer is a resiliently deformable core layer comprising one or more platelet fillers.

3. The gasket of claim 2, wherein the one or more platelet fillers comprises talc, mica, chemically exfoliated vermiculite, or thermally exfoliated vermiculite.

4. A method of producing or sealing a solid oxide fuel cell comprising incorporating the gasket of claim 1 into the solid oxide fuel cell.

5. The gasket of claim 1, wherein the glass component comprises particles of glass material.

6. The gasket of claim 1, wherein the glass component is present in a range of 10-90 wt % of the glass coating composition.

7. The gasket of claim 1, wherein the glass component comprises $SiO_2$, $Al_2O_3$, $B_2O_3$, BaO, $Bi_2O_3$, CaO, $Cs_2O$, $K_2O$, $La_2O_3$, $Li_2O$, MgO, $Na_2O$, PbO, $Rb_2O$, $Sb_2O_3$, SnO, SrO, $TiO_2$, $Y_2O_3$, or ZnO.

8. The gasket of claim 1, wherein the glass component is of the type which hardens and sets in water.

9. The gasket of claim 1, wherein the level of retarder in the glass coating composition is between 0.02 to 20 wt % retarder.

10. The gasket of claim 1, wherein the binder comprises one or more cellulose binders; acrylate homo or copolymers; vinyl acetate homo or copolymers; ethylene copolymers; or polyvinyl butyral.

11. The gasket of claim 10, wherein the binder comprises one or more acrylate homo or copolymers; or vinyl acetate homo or copolymers.

12. The gasket of claim 1, wherein the level of binder in the glass coating composition is in a range of 1 to 20 wt %.

13. A gasket for sealing two mating surfaces of a fuel cell, the gasket comprising a core layer interposed between a first coating layer and a second coating layer, wherein the first and second coating layers each comprise a glass component capable of forming an alkaline solution in an equivalent amount of water by weight, and a retarder comprising a lignin, lignosulfonate, or a salt thereof; a hydroxycarboxylic acid or salt thereof; a vinyl polymer; a monosaccharide or disaccharide; a fluorate; a borate; or a derivative or mixture thereof.

14. The gasket of claim 13, wherein the level of the glass component in each of the first and second coating layers is in a range of between 60 to 99.45 wt % based on a total weight of the coating layer not including any liquid carrier.

15. A fuel cell or fuel cell component comprising the gasket of claim 13, wherein the retarder comprises a fluorate; a borate; or a derivative or mixture thereof.

16. The gasket of claim 7, wherein the glass component comprises $Al_2O_3$, $B_2O_3$, BaO, CaO, or ZnO.

17. The gasket of claim 13, wherein the glass component comprises $SiO_2$, $Al_2O_3$, $B_2O_3$, BaO, $Bi_2O_3$, CaO, $Cs_2O$, $K_2O$, $La_2O_3$, $Li_2O$, MgO, $Na_2O$, PbO, $Rb_2O$, $Sb_2O_3$, SnO, SrO, $TiO_2$, $Y_2O_3$, or ZnO.

18. The gasket of claim 17, wherein the glass component comprises $Al_2O_3$, $B_2O_3$, BaO, CaO, or ZnO.

19. The gasket of claim 13, wherein the core layer is a resiliently deformable core layer comprising one or more platelet fillers.

20. The gasket of claim 19, wherein the one or more platelet fillers comprises talc, mica, chemically exfoliated vermiculite, or thermally exfoliated vermiculite.

* * * * *